(12) United States Patent
Bertin et al.

(10) Patent No.: US 10,614,020 B2
(45) Date of Patent: Apr. 7, 2020

(54) SWITCH FOR REVERSIBLE INTERFACE

(71) Applicant: INTERDIGITAL CE PATENT HOLDINGS, Paris (FR)

(72) Inventors: Jean-Pierre Bertin, Guemene-Penfao (FR); Ludovic Jeanne, Montreuil sur Ille (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/314,159

(22) PCT Filed: Jun. 13, 2017

(86) PCT No.: PCT/EP2017/064342
§ 371 (c)(1),
(2) Date: Dec. 28, 2018

(87) PCT Pub. No.: WO2018/001713
PCT Pub. Date: Jan. 4, 2018

(65) Prior Publication Data
US 2019/0227973 A1     Jul. 25, 2019

(30) Foreign Application Priority Data
Jun. 28, 2016   (EP) .................................. 16305781

(51) Int. Cl.
*G06F 13/40*   (2006.01)

(52) U.S. Cl.
CPC .. *G06F 13/4068* (2013.01); *G06F 2213/0042* (2013.01)

(58) Field of Classification Search
CPC ............. G06F 13/4068; G06F 13/4081; G06F 2212/0042
See application file for complete search history.

(56) References Cited

U.S. PATENT DOCUMENTS

| | | |
|---|---|---|
| 5,795,182 A | 8/1998 | Jacob |
| 8,982,968 B2 | 3/2015 | Kim |
| 9,077,178 B2 | 7/2015 | Mullins |
| 2015/0363339 A1 | 12/2015 | Huang et al. |
| 2016/0246747 A1* | 8/2016 | Rand ...................... G06F 13/385 |
| 2018/0239718 A1* | 8/2018 | Jabori ................. G06F 13/4295 |

FOREIGN PATENT DOCUMENTS

| | | |
|---|---|---|
| CN | 102570840 | 7/2012 |
| EP | 2590274 | 5/2013 |
| JP | 2009278706 | 11/2009 |
| WO | WO2015079215 | 6/2015 |
| WO | WO2015191790 | 12/2015 |

* cited by examiner

*Primary Examiner* — Glenn A. Auve
(74) *Attorney, Agent, or Firm* — Invention Mine LLC

(57) ABSTRACT

An arrangement and method for accommodating a reversible connector in a device that does not require the use of a controller or firmware comprises detection circuitry for detection of an orientation of an external connector connected to the reversible connector. Two switches allow to connect electrical wiring of the device to either one of a set of pins of the reversible connector according to the detected orientation. The switches operate independently and each comprise separate detection circuitry.

10 Claims, 7 Drawing Sheets

PRIOR ART

USB Type-C Receptacle Interface (Front View)

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | SBU1 | VBUS | RX2− | RX2+ | GND |
| GND | RX1+ | RX1− | VBUS | SBU2 | D− | D+ | CC2 | VBUS | TX2− | TX2+ | GND |
| B12 | B11 | B10 | B9 | B8 | B7 | B6 | B5 | B4 | B3 | B2 | B1 |

Fig. 1

PRIOR ART

PRIOR ART

SWITCH FOR REVERSIBLE INTERFACE

This application claims the benefit, under 35 U.S.C. § 365 of International Application PCT/EP2017/064342, filed Jun. 13, 2017, which was published in accordance with PCT Article 21(2) on Jan. 4, 2018, in English, and which claims the benefit of European Patent Application No. 16305781.3 filed Jun. 28, 2016.

FIELD

The present disclosure generally relates to the field of reversible communication interfaces.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Manufacturers of electronic devices make a continuous effort to improve the user-friendliness of their devices. Part of the user-friendliness is the ability to interface an electronic device with many kinds of different other electronic devices to exchange data. Government instances and standardization bodies work towards a reduction of the number of different user interfaces used for a similar purpose, in order to reduce the multiplicity of different cables and connectors required and thus to reduce electronic waste and to reduce additional costs for consumers. As an example, a European Commission initiative resulted in the specification of a common external power supply with the micro-USB format for use with data-enabled mobile phones sold in the European Union. The incompatibility of chargers was seen as a major environmental problem and an inconvenience for users. A further inconvenience for users is that with many types of currently used connectors the consumer must take care to connect the connector the right way round. Often, several trials are required to correctly insert the connector. Frequent attempts to connect the connector the wrong way round can ultimately lead to mechanical damage to the connector and/or to the device receiving the connector. The advent of reversible connectors is a further improvement in this sense. Example reversible connectors are Apple's Lightning and the USB Type-C connector. However, it is a further challenge for electronic device manufacturers to comply with connector reversibility as it requires extra wiring, additional electronic components and software for switching and control.

There is thus a need for further optimization of solutions for hosting interfaces for reversible connectors.

SUMMARY

According to one aspect of the present disclosure, a device is provided that comprises a plurality of switches configured to couple electrical wiring to contacts of a reversible connector for reversibly connecting either a first set of connector contacts of the reversible connector or a second set of connector contacts of the reversible connector to the electrical wiring according to an orientation of an external connector for connecting to the reversible connector. The device comprises first enable circuitry coupled to at least one of the first set of connector contacts and second enable circuitry coupled to at least one of the second set of connector contacts. The first enable circuitry is configured to generate a first enable signal to a first switch of the plurality of switches in response to a presence of a feature of a signal received on the at least one of the first set of connector contacts, and the second enable circuitry is configured to generate a second enable signal to a second switch of the plurality of switches in response to a presence of a feature of a signal received on the at least one of the second set of connector contacts. The first and the second switches are in a disconnected state, in which no contact is made between either set of connector contacts and the electrical wiring, when none of the first and the second enable signals is generated by either of the first and the second enable circuitry. The first switch is configured to switch to a connected state, in which the first set of connector contacts are coupled to the electrical wiring, in response to the first enable signal. The second switch is configured to switch to a connected state in which the second set of connector contacts are coupled to the electrical wiring, in response to the second enable signal.

According to a variant embodiment of the device, the feature of the signal received on the at least one of the first and the second contacts is a presence of a Direct Current component in the signal received.

According to a variant embodiment of the device, at least one of the first and the second enable circuitry comprises a DC filter.

According to a variant embodiment of the device, the at least one of the first and the second enable circuitry comprises a comparator configured to compare the signal received with a reference signal and configured to generate the enable signal when the signal received corresponds to the reference signal.

According to a variant embodiment of the device, the reversible connector is a Universal Serial Bus Type-C connector.

According to a variant embodiment of the device, the signal is an Ethernet transmission signal.

The present principles also relate to a method for coupling electrical wiring of a device to a reversible connector of the device for reversibly connecting either a first set of connector contacts of the reversible connector or a second set of connector contacts of the reversible connector to the electrical wiring according to an orientation of an external connector for connecting to the reversible connector. The method comprises a first detection of a presence of a feature of a signal applied to at least one of the first set of connector contacts and a second detection of a presence of a signal applied to at least one of the second set of connector contacts. The method further comprise a generation of a first enable signal in response to the first detection and a generation of a second enable signal in response to the second detection. The method further comprises, in response to the first enable signal, setting of a first switch from a disconnected position in which no contact is made between the first set of connector contacts to a connected position in which contact is made between the first set of connector contacts and the electrical wiring, and in response to the second enable signal, setting of a second switch from a disconnected position in which no contact is made between the second set of connector contacts to a connected position in which contact is made between the second set of connector contacts and the electrical wiring.

According to an embodiment of the method, the detection of a presence of a feature of the signal received is a detection of a presence of a Direct Current component in the signal received.

According to an embodiment of the method, the detection of the presence of a Direct Current component in the signal received comprises a filtering of the Direct Current component from the signal received.

According to an embodiment of the method, the detection of a presence of a feature of the signal received is based on a comparing of the signal received with a reference signal.

BRIEF DESCRIPTION OF THE DRAWINGS

More advantages of the present disclosure will appear through the description of particular, non-restricting embodiments. In order to describe the manner in which the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure.

The exemplary embodiments will be described with reference to the following drawings in which:

FIG. 1 is an example reversible connector.

Figure 2A:
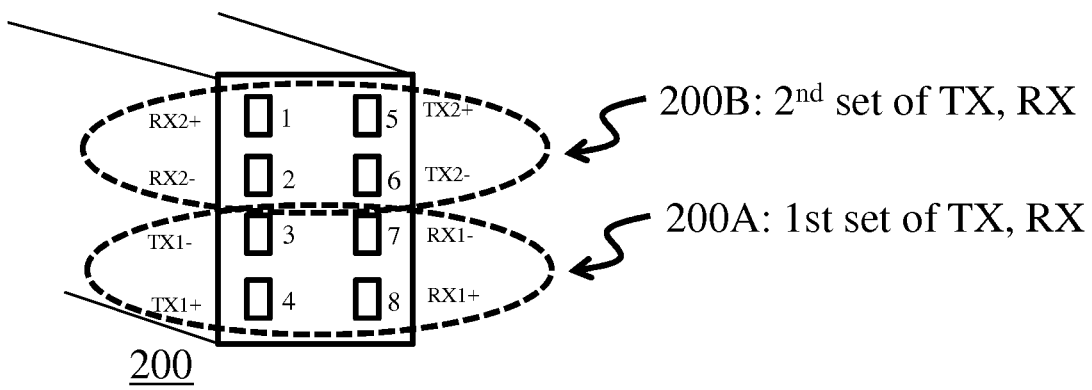
FIG. 2 shows typical reversible connectors for bidirectional digital data communication purposes.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

FIG. 1 is an example reversible connector, here of the USB Type-C. The 24-pin double-sided USB Type-C connector provides four power/ground pairs, two differential pairs for non-SuperSpeed data (though only one pair is populated in a Type-C cable), four pairs for high-speed data bus, two "sideband use" pins (SBU1, SBU2), and two configuration pins (CC1, CC2) for cable orientation detection, and power. Dedicated control logic such as the Texas-Instruments TUSB320 Type-C™ Configuration Channel Logic and Port Control, have been developed to use the CC pins according to the Type-C specifications, and can determine port attach and detach, cable orientation, role detection, and port control. Upon connection of a device to a USB Type-C port, a CC logic block monitors the CC1 and CC2 pins for pullup or pulldown resistances to determine when a USB port has been attached, the orientation of the cable, and the role detected (sink, source, or dual mode). Based on the determination, the apparatus hosting the USB Type-C interface can set up the connections from the pins of the connector to the logic behind it, which generally is done in software (also referred to as 'firmware'), and then requires a micro-controller or CPU (Central Processing Unit) or processor and memory. Furthermore, if the CC pins are not correctly used as described in the standard documents, damage may be caused to electronic components connected to the apparatus(es) hosting the interface.

It would be desirable to have a robust solution that does not to rely on correct use of CC pins and that does not require complicated control logic or software. A solution to this problem can leverage the use of reversible connectors in devices.

FIG. 2 shows typical reversible connectors for bidirectional digital data communication purposes, e.g., for transmission and reception of Ethernet signals, or for I2C bus data communication.

Turning to FIG. 2a, the typical reversible connector 200 comprises eight pins. The pins on the left side of the reversible connector 200 are an inverse projection of the pins on the right side and vice versa. A first set of pins 200A (pins 3, 4, 7, and 8) comprises a first differential pair for data transmission (pins 3,4; TX1+ and TX1−) and a first differential pair for data reception (pins 7,8; RX1− and RX1+). A second set of pins 200B (pins 1, 2, 5 and 6) comprises a second differential pair for data transmission (pins 5, 6; TX2+ and TX2−) and a second differential pair for data reception (pins 1, 2; RX2+ and RX2−). With this pin arrangement, a reversible connector is created, as will become apparent in light of the following.

Figure 2B:
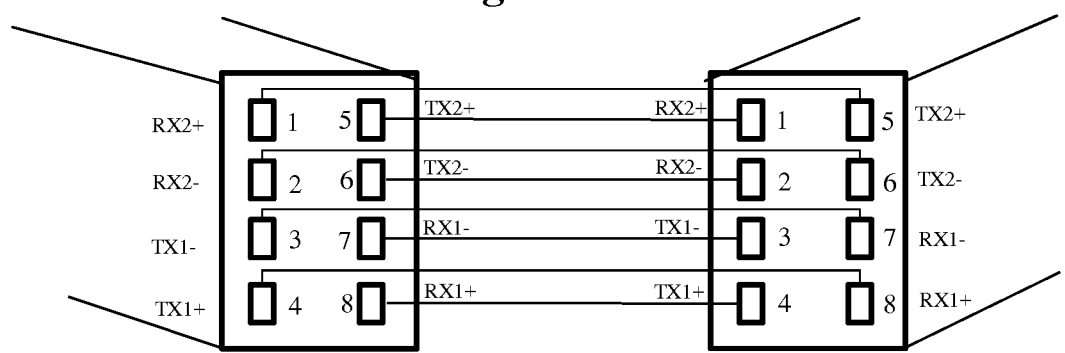

In FIG. 2b, two reversible connectors 210 and 220 of type 200 can be interconnected straightly, for example, directly if the connectors are mating (e.g., if connector 210 is a male connector, and connector 220 is a female connector; or vice versa) or by means of a straight cable. Thus, pins 1-4 of connector 210 are connected to pins 5-8 of connector 220, and pins 5-8 of connector 210 are connected to pins 1-4 of connector 220. It can be observed that each of the differential pairs of connector 210 (RX and TX) are then correctly connected to a mating differential pair of connector 220 (TX and RX), so that RX of connector 210 is connected to TX of connector 220 and TX of connector 210 is connected to RX of connector 220.

Figure 2C:
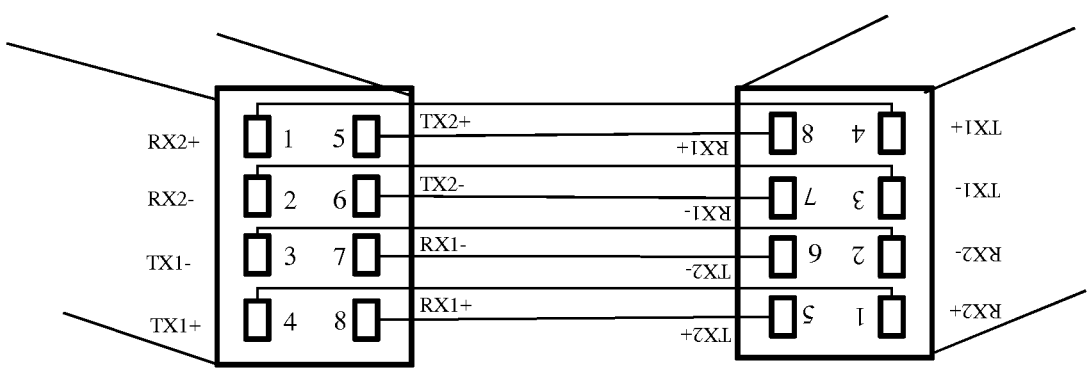

In FIG. 2c, the same two reversible connectors 210 and 220 are depicted, but connector 220 is illustrated as being turned upside down. The connectors can be connected this way, directly or with a straight cable. Then, pins 1-4 of connector 210 are connected to pins 4-1 of connector 220, and pins 5-8 of connector 210 are connected to pins 8-5 of connector 220. Again, it can be observed that each of the differential pairs of connector 210 (RX and TX) is correctly connected to a mating differential pair of connector 220 (TX and RX).

With the pin layout of the typical reversible connector, connections are made correctly—no matter in which way round the connectors are interconnected.

Figure 3:
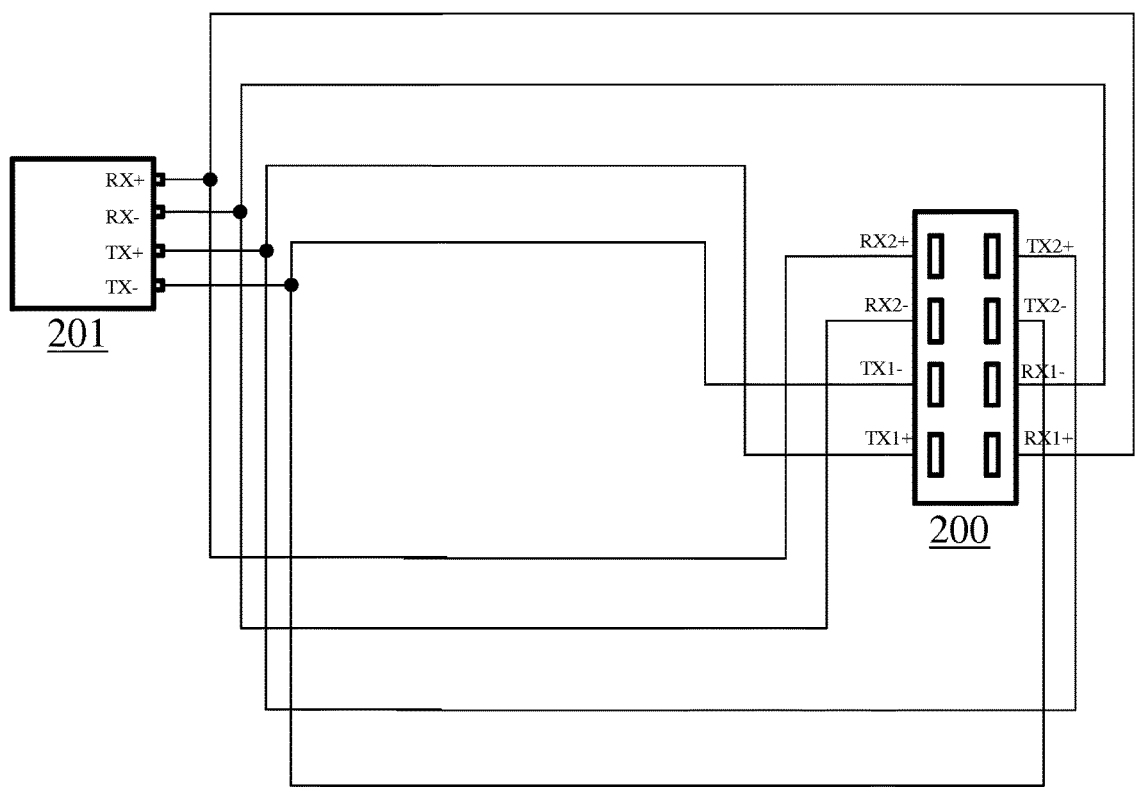
FIG. 3 shows how the typical reversible connector is wired to a non-reversible connector.

FIG. 3 shows how the typical reversible Ethernet connector 200 is wired to a standard, non-reversible Ethernet connector 201.

Figure 4:
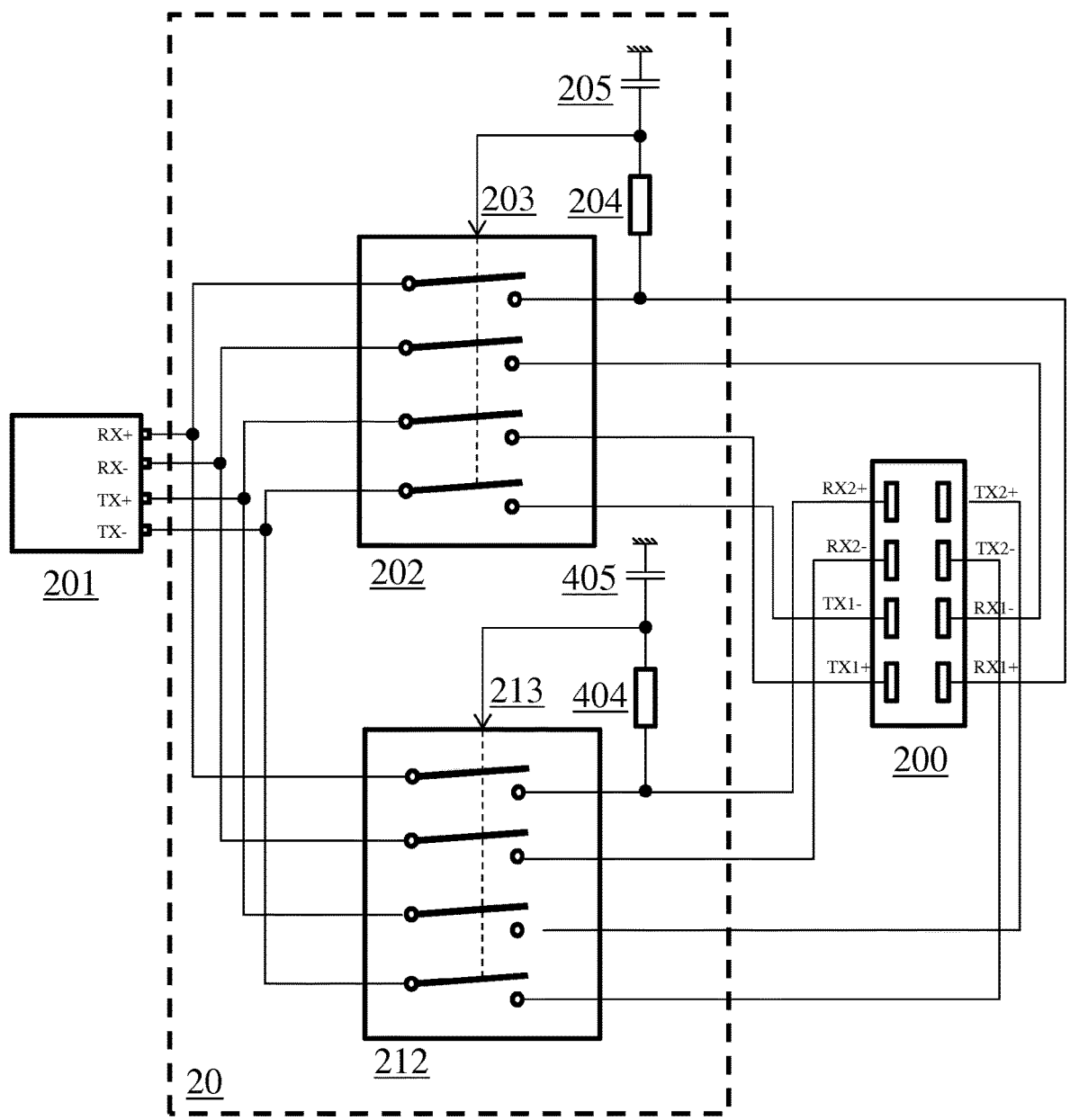
FIG. 4 is an exemplary arrangement for connecting a reversible connector according to the present principles.

FIG. 4 is an exemplary arrangement for connecting a reversible connector according to the present principles and provides an improvement to the typical arrangement of FIG. 3. The exemplary arrangement of FIG. 4 comprises a circuitry 20. The circuitry 20 comprises a first switch 202. Switch 202 can be enabled through a first enable input 203. Connected to the first enable input is a first enable circuitry comprised of a first resistor 204 and a first capacitor 205. First resistor 204 is connected on one side to a receive data line (RX1+) of a first set of differential RX/TX pairs of connector 210 and on the other side to the first enable input 203 and to first capacitor 205. First capacitor 205 is connected to ground. The circuitry 20 comprises a second switch 212, with a second enable input 213. Connected to the second enable input is a second enable circuitry comprised of resistor 404, capacitor 405. Second resistor 404 is connected on one side to a second receive data line (RX2+) of a second set of differential RX/TX pairs of connector 210 and on the other side to the second enable input 213 and to second capacitor 405. Second capacitor 405 is connected to ground. Resistor 404 and capacitor 405 are calculated as mentioned above for resistor 204 and capacitor 205. Circuitry 20 comprises two switches and associated enable circuitry. Switch 212 and enable circuitry 404-405 operate in a similar manner as switch 202 and enable circuitry 203-205. These switches operate independently. Thus, at any time, depending on how the transmission signals are connected to connector 200, both switches 202 and 212 are in an open state or one switch 202 or 212 is in a closed state. Advantageously, no electrical connection is made between connector 200 and 201 when no valid transmission signal is present on any of the RX pins of connector 200 which advantageously electrically protects any circuitry behind the switches, such as circuitry (not shown) behind connector 201.

According to another embodiment, either one or both capacitors 205 or 405 of the enable circuits is/are connected to Vcc (positive voltage) instead of being connected to earth as depicted, in which case either one or both resistors 204 or 404 is/are connected to the negative pole of the RX pair (so, to RX1− or RX2−).

Figure 5A:
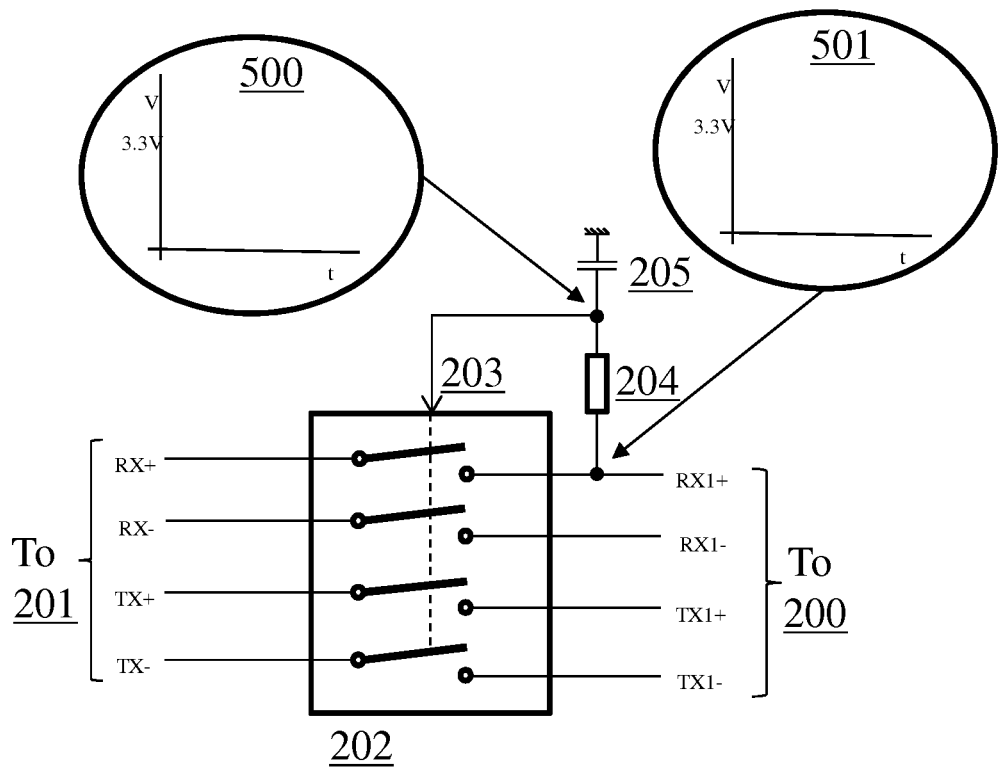
FIG. 5 is a detailed view of circuitry according to the present principles.
Figure 5B:
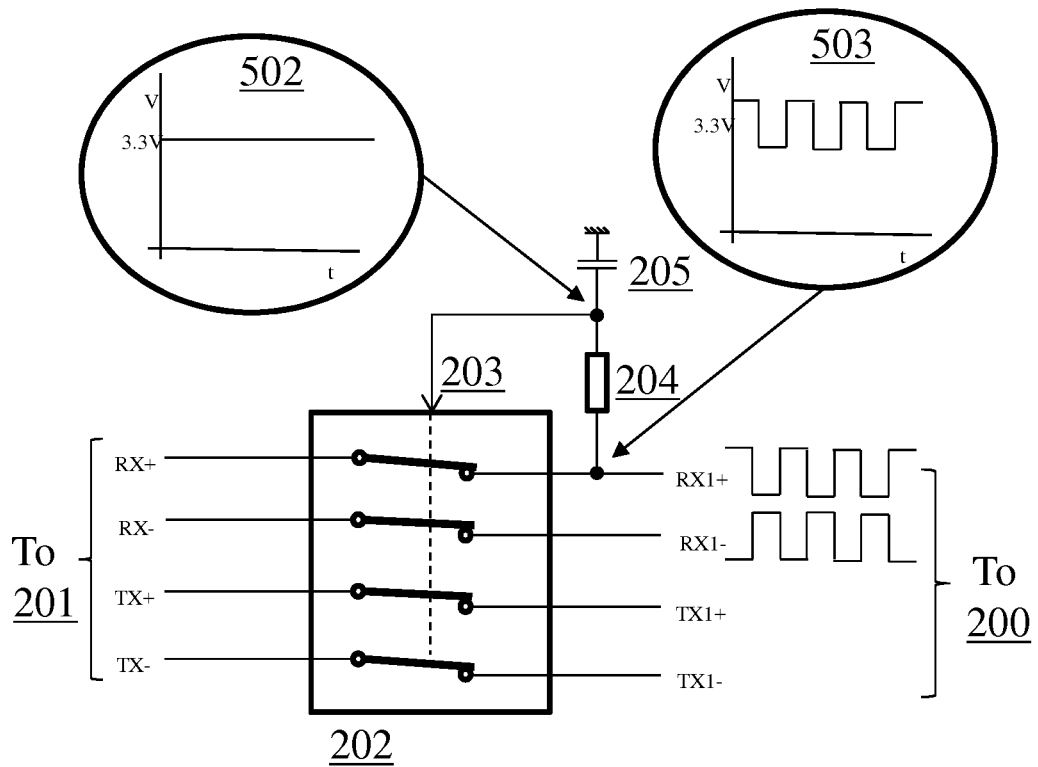

FIG. 5 is a detailed view of switch 202 with enable circuitry 204, 205, with switch 202 open in a first configuration shown in FIG. 5a and closed in a second configuration shown in FIG. 5b.

In the first configuration 5a, no signal 501 is received from connector 200 on the RX1+ input of switch 202. Consequently, switch 202 is in a disabled (open) state as the enable input 203 receives no enable signal 500.

In the second configuration 5b, a transmission signal 503 is received from connector 200 on the RX1+ input of switch 202. The transmission signal has the particularity to be superposed on a 3.3 VDC component. Resistor 204 and capacitor 205 function as a DC filter, filtering out the DC component 502. Consequently, an enable signal 502 is provided to switch 202, and the switch is in a closed state wherein electrical contact is made between connector 210 and connector 201. It can thus be observed that a feature of an input signal, here a DC component of a transmission signal, is used for establishing an electrical connection.

To separate the DC component from the data transmission signal, a low cut-off frequency is preferable. For transmission signals such as Ethernet 10BaseT and higher (100BaseT/1000BaseT), a cut-off frequency of 1 MHz is convenient for removing the high frequency components from the transmission signal and only keep the DC component. The value of resistor 204/404 is chosen as a function of the current to be drawn from the transmitter for operating the DC filter. Depending on the transmitter driver, a typical acceptable current range is between some hundreds of micro amps to some milli amps. Given that according to Ohm's law:

$$I = \frac{V}{R}$$

This gives for a 3.3V DC component a range of, for example, 1K Ohm (I=3.3 mA) to 10K Ohm (I=3300) for resistor 204/404. The value of capacitor 205/405 is then calculated as a function of the desired cut-off frequency of the filter and the value of resistor 204/404, according to the formula:

$$F = \frac{1}{2\pi RC}$$

In the example case of F=1 MHz and R=1K, C is thus 160 nF. For F=1 MHz and R=10K, C=16 nF.

Advantageously, no control software ('firmware') and no processor is required to operate the switches.

According to a further embodiment, the enable circuitry comprise a comparator that allows to compare the signal received on the RX input with a reference signal and only to provide the enable signal if the signal received on the RX input corresponds to the reference signal.

According to another embodiment, a delay is added to the switching from the connected to the disconnected position, to allow a temporary absence of the feature in the signal received and avoid switching of the switches during the temporary absence.

Figure 6:
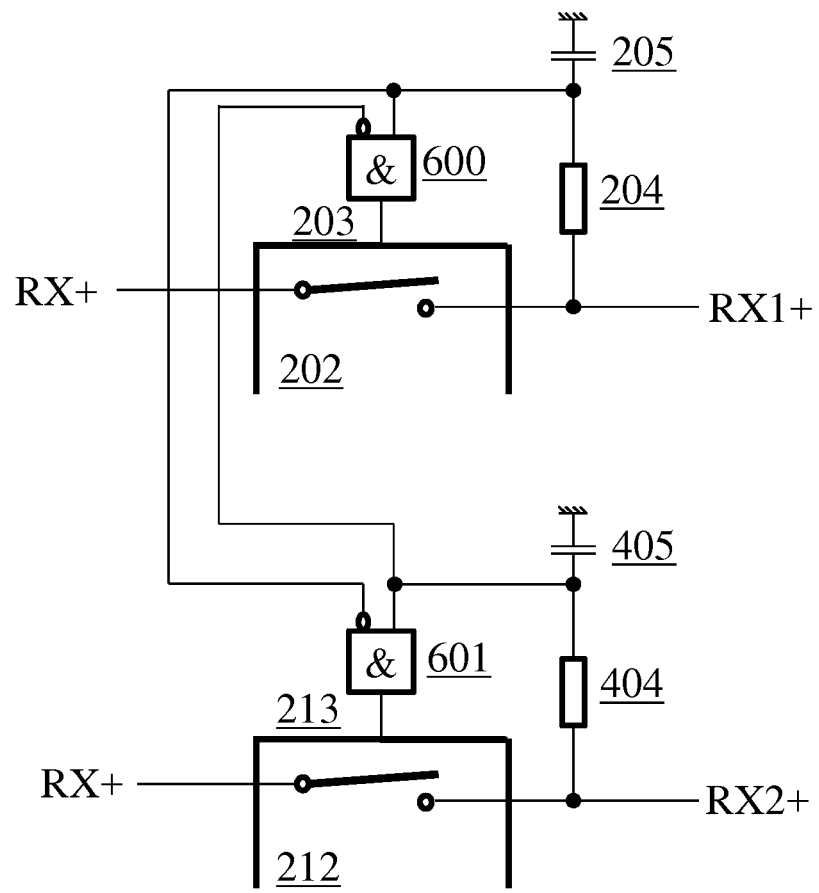
FIG. 6 is a variant embodiment of the present principles.

FIG. 6 is variant further embodiment of the present principles that comprises a further logic circuitry using ANDs and inverters which are arranged to avoid that both switches 202 and 212 are simultaneously in a closed state, which can occur when it happens that transmission signals are connected to both RX terminals at the same time. Such a circuitry comprises, for the first switch 202, a logic AND function 600 and for the second switch a logic AND function 601. Each of the AND functions 600 and 601 comprises an inverter on one of its inputs. This arrangement has the effect that for each of the switches, in order to set the switch in the connected position a condition is added to the presence of a transmission signal, namely that the other transmission signal is absent. E.g., to enable switch 202, the presence of a transmission signal on the RX1+ terminal is required, and the absence of a transmission signal on the RX2+ terminal is required. This is the inverse for switch 212.

Figure 7:
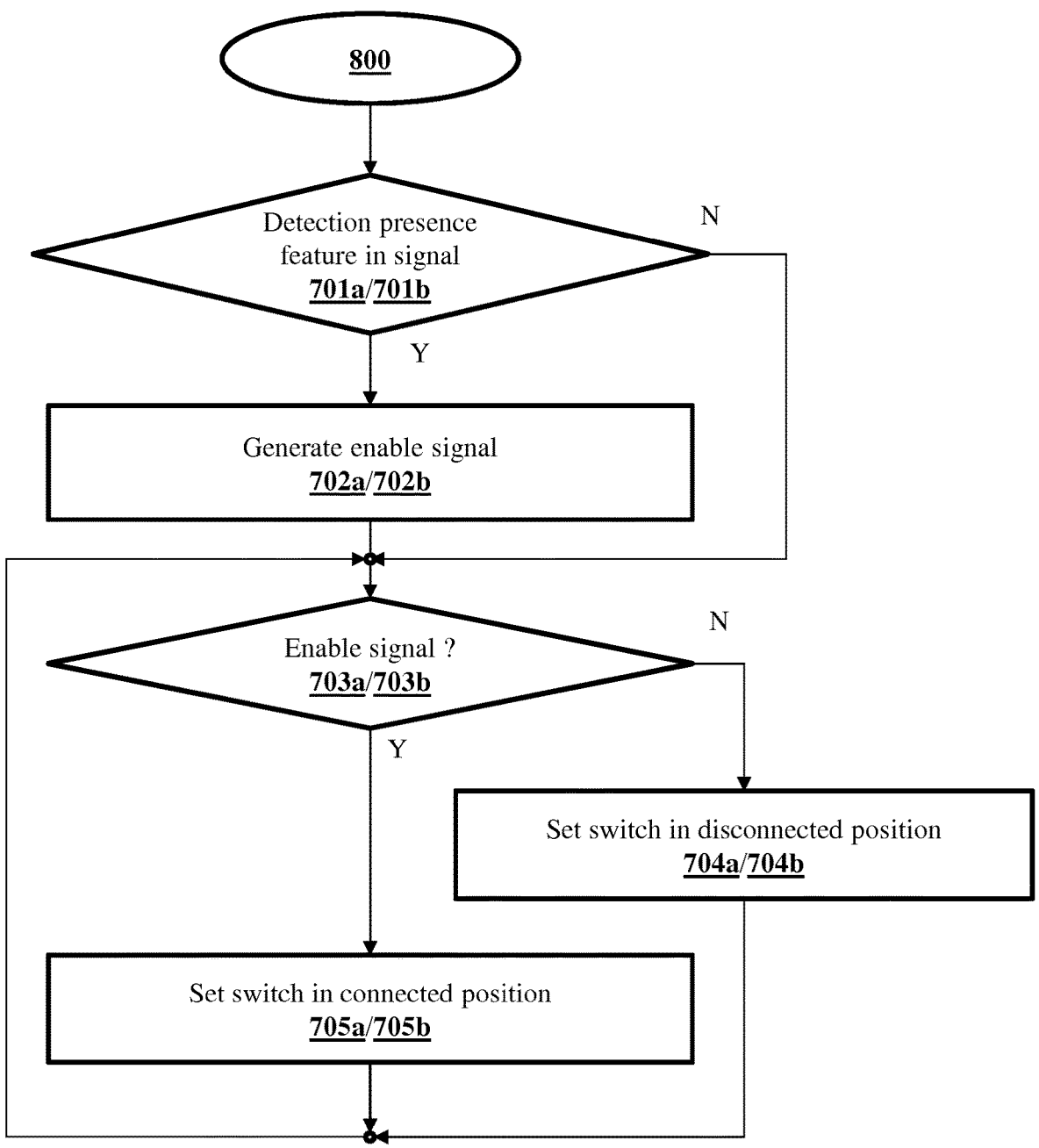
FIG. 7 is a flow chart of a method for coupling electrical wiring of a device to a reversible connector according to an embodiment of the present principles.

FIG. 7 is a flow chart of a method 700 for coupling electrical wiring of a device to a reversible connector 200 of a device for reversibly connecting either a first set of connector contacts 200A of the reversible connector or a second set of connector contacts 200B of said reversible connector to the electrical wiring according to an orientation of an external connector for connecting to the reversible connector according to an embodiment of the present principles. Step 701a is a detection of a feature of a signal applied to at least one of the first set of connector contacts 200A and step 701b is a detection of a feature of a signal applied to at least one of the second set of connector contacts 200B. In step 702a a first enable signal is generated in response to the first detection and a second enable signal 702b is generated in response to the second detection. The presence of a first enable signal is verified in step 703a and the presence of a second enable signal is verified in step 703b. If the first enable signal is present, the first switch is set in step 704a to a connected position where contact is made between the first set of connector contacts and the electrical wiring. If the second enable signal is present, the second switch is set in step 704b to a connected position where contact is made between the second set of connector contacts and the electrical wiring. If the first enable signal is not present, the first switch is set in step 705a to a disconnected position where no contact is made between the first set of connector contacts and the electrical wiring. If the second enable signal is not present, the second switch is set in step 705b to a disconnected position where no contact is made between the second set of connector contacts and the electrical wiring.

According to another embodiment of the method, the detection of a presence of a feature of the signal received is a detection of a presence of a DC component in the signal received. According to a variant embodiment of the method, the detection of the DC component in the signal received comprises a filtering of the DC component from the signal received. Such detection is for example done with an RC filter circuitry according to FIG. 4, or with a comparator circuitry (not shown).

According to a further embodiment of the method, the detection of a presence of a feature of the signal received is based on a comparing of the signal received with a reference signal.

It is to be appreciated that some elements in the drawings may not be used or be necessary in all embodiments. Some operations may be executed in parallel. Variant embodiments other than those illustrated and/or described are possible. For example, the arrangement may be comprised in a connector cable.

It is to be appreciated that aspects of the present principles can be embodied as a system, method or computer readable medium. Accordingly, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. An electronic device comprising:
a plurality of switches configured to couple electrical wiring to contacts of a reversible connector for reversibly connecting either a first set of connector contacts of said reversible connector or a second set of connector contacts of said reversible connector to said electrical wiring according to an orientation of an external connector for connecting to said reversible connector;
first enable circuitry coupled to at least one of the first set of connector contacts and second enable circuitry coupled to at least one of the second set of connector contacts;
the first enable circuitry being configured to generate a first enable signal to a first switch of said plurality of switches in response to a presence of a feature of a signal received on said at least one of the first set of connector contacts, and the second enable circuitry being configured to generate a second enable signal to a second switch of said plurality of switches in response to a presence of a feature of a signal received on said at least one of the second set of connector contacts;
the first and the second switches being in a disconnected state, in which no contact is made between either set of connector contacts and said electrical wiring, when none of said first and said second enable signals is generated by either of said first and said second enable circuitry;
the first switch being configured to switch to a connected state, in which said first set of connector contacts are coupled to said electrical wiring, in response to said first enable signal; and
the second switch being configured to switch to a connected state in which said second set of connector contacts are coupled to said electrical wiring, in response to said second enable signal.

2. The electronic device according to claim 1, wherein said feature of said signal received on said at least one of the first and the second contacts is a presence of a Direct Current component in said signal received on said at least one of the first and the second contacts.

3. The electronic device according to claim 2, wherein at least one of the first and the second enable circuitry comprises a DC filter.

4. The electronic device according to claim 1, wherein at least one of the first and the second enable circuitry comprises a comparator configured to compare said signal received on said at least one of the first and the second contacts with a reference signal and configured to generate said enable signal when said signal received on said at least one of the first and the second contacts corresponds to said reference signal.

5. The electronic device according to claim 1, wherein said reversible connector is a Universal Serial Bus Type-C connector.

6. The electronic device according to claim 1, wherein said signal on said at least one of the first and the second contacts is an Ethernet transmission signal.

7. A method for coupling electrical wiring of a device to a reversible connector of said device for reversibly connecting either a first set of connector contacts of said reversible connector or a second set of connector contacts of said reversible connector to said electrical wiring according to an orientation of an external connector for connecting to said reversible connector, said method comprising:

detecting a presence of a feature of a first signal applied to at least one of said first set of connector contacts and detecting a presence of a second signal applied to at least one of said second set of connector contacts;

generating a first enable signal in response to said detection of said first signal and generating a second enable signal in response to said detection of said second signal;

in response to said first enable signal, setting of a first switch from a disconnected position in which no contact is made between said first set of connector contacts to a connected position in which contact is made between said first set of connector contacts and said electrical wiring, and in response to said second enable signal, setting of a second switch from a disconnected position in which no contact is made between said second set of connector contacts to a connected position in which contact is made between said second set of connector contacts and said electrical wiring.

8. The method according to claim 7, wherein said detection of a presence of a feature of said first and second signals received on said at least one of the first and the second contacts is detection of a presence of a Direct Current component received on said at least one of the first and the second contacts.

9. The method according to claim 8, wherein said detection of said presence of a Direct Current component received on said at least one of the first and the second contacts comprises a filtering of said Direct Current component from said first and second signals received on said at least one of the first and the second contacts.

10. The method according to claim 7, wherein said detection of a presence of a feature of said first and second signals received on said at least one of the first and the second contacts is based on a comparing of said first and second signals received on said at least one of the first and the second contacts with a reference signal.

* * * * *